(12) United States Patent
Lane et al.

(10) Patent No.: US 10,716,293 B1
(45) Date of Patent: Jul. 21, 2020

(54) ANIMAL WATERING DEVICE WITH CHECK VALVE

(71) Applicant: Lane Industries Company, LLC, Cudahy, WI (US)

(72) Inventors: Timothy E. Lane, Cudahy, WI (US); Paul S. Johnson, Muskego, WI (US)

(73) Assignee: LANE INDUSTRIES, LLC, Cudahy, WI (US)

( * ) Notice: Subject to any disclaimer, the term of this patent is extended or adjusted under 35 U.S.C. 154(b) by 258 days.

(21) Appl. No.: 16/044,543

(22) Filed: Jul. 25, 2018

(51) Int. Cl.
   *A01K 39/02* (2006.01)
   *F16K 15/04* (2006.01)
   *A01K 7/06* (2006.01)

(52) U.S. Cl.
   CPC ............ *A01K 39/0213* (2013.01); *A01K 7/06* (2013.01)

(58) Field of Classification Search
   CPC ........ A01K 39/0213; A01K 7/06; A01K 7/00; A01K 39/00; A01K 39/02; F16K 15/044; F16K 15/04
   See application file for complete search history.

(56) References Cited

U.S. PATENT DOCUMENTS

| 8,844,467 B1 | 9/2014 | Folkerts, Jr. et al. |
| 9,433,190 B2 * | 9/2016 | Johnson ................... A01K 7/06 |

FOREIGN PATENT DOCUMENTS

| WO | WO-2015163199 A1 * | 10/2015 | ............ F16K 15/044 |
| WO | WO-2016039728 A1 * | 3/2016 | ............. E21B 34/06 |

* cited by examiner

*Primary Examiner* — Kristen C Hayes
(74) *Attorney, Agent, or Firm* — Donald J. Ersler

(57) ABSTRACT

An animal watering valve preferably includes a valve device, a check ball, a screen disc and retention tail. The valve device preferably includes a valve body, a valve stem, a retention plug, a stem o-ring and a compression spring. The valve body preferably includes a threaded shank. A valve bore is formed in the valve body to receive the valve stem. A plug bore is formed in the threaded shank. The retention plug preferably is threaded into the plug bore. The retention tail preferably includes a receiver body and an attachment shaft. The receiver body includes a ball tapered counter bore to receive the check ball and a screen counter bore to receive the screen disc. The threaded shank tap is sized to threadably receive the threaded shank of the valve body. A valve extender is used to increase a length of the animal watering valve.

20 Claims, 3 Drawing Sheets

ANIMAL WATERING DEVICE WITH CHECK VALVE

BACKGROUND OF THE INVENTION

1. Field of the Invention

The present invention relates generally to feeding animals and more specifically to an animal watering device with check valve, which prevents contaminated water from being sucked back into a main water supply during a flushing cycle.

2. Discussion of the Prior Art

U.S. Pat. No. 4,282,831 to Nilsen discloses a back flow check and self-cleaning spring biased waterer valve. U.S. Pat. No. 8,844,467 to Folkerts, Jr. et al. discloses a drinking valve for automatic water feeding systems for animals. U.S. Pat. No. 9,433,190 to Johnson et al. discloses an animal watering valve. U.S. Pat. No. 8,844,467 is hereby incorporated into this patent application by reference in its entirety.

Accordingly, there is a clearly felt need in the art for an animal watering device with check valve, which prevents contaminated water inside the watering device from being sucked back into a main water supply during a flushing cycle of an animal watering system.

SUMMARY OF THE INVENTION

The present invention provides an animal watering device with check valve, which prevents contaminated water from being sucked back into a main water supply during a flushing cycle. The animal watering device with check valve (animal watering device) preferably includes a valve device, a check ball, a screen disc and retention tail. The valve device preferably includes a valve body, a valve stem, a retention plug, a stem o-ring and a compression spring. The valve body preferably includes a bullet nose formed on one end and a threaded shank formed on an opposing end thereof. The threaded shank preferably has a diameter that is less than an outer diameter of the valve body. A body o-ring groove is formed between an end of the valve body and an end of the threaded shank to receive a body o-ring. A valve bore is formed in the one end of the valve body to receive the valve stem. A through hole is formed through a length of the valve body. A plug bore is formed in the opposing end of the valve body to substantially a middle of a length thereof. A portion of an entrance of the plug bore is threaded to form a plug thread. The valve stem preferably includes an actuation end, a plug end and a spring flange. The actuation end extends from one end of the spring flange and the plug end extends from an opposing end of the spring flange. A reduced diameter is formed on a plug end of the valve stem.

The retention plug preferably includes a threaded portion, a rotation flange and a stem portion. The stem portion extends from one end of the threaded portion and the rotation flange is formed on an opposing end of the threaded portion. A pair opposing flats are preferably formed on an outer perimeter of the rotation flange. The plug thread of the valve body is sized to threadably receive the threaded portion of the retention plug. A stem bore is formed through the retention plug. The stem bore is sized to loosely receive the plug end of the valve stem. The compression spring is preferably conical shaped. However, a cylindrically shaped compression spring may also be used. The retention tail preferably includes a receiver body and an attachment shaft.

The attachment shaft extends from an end of the receiver body. The attachment shaft may include a quick release profile, threads or any other suitable design. The receiver body includes a ball tapered counter bore, a screen counter bore, a threaded shank tap and an o-ring counter bore formed in one end thereof. A water bore (water opening) is formed through the retention tail. The ball counter bore is sized to receive the check ball. The screen counter bore is sized to receive the screen disc. The threaded shank tap is sized to threadably receive the threaded shank of the valve body. The o-ring counter bore is sized to receive the body o-ring.

A valve extender may be used to extend a length of the animal watering device. The valve extender preferably includes an extender receiver body and an extender threaded shank. The extended threaded shank extends from an end of the extender receiver body. The extender receiver body includes a threaded shank tap and an o-ring counter bore formed in one end thereof. A water bore is formed through the valve extender. The extender threaded shank tap is sized to threadably receive the threaded shank of the valve body. The o-ring counter bore is sized to receive the body o-ring. The extender threaded shank is sized to be threadably received by the threaded shank tap of the retention tail.

The animal watering valve is preferably assembled in the following manner. The stem o-ring is pushed on to the actuation end of the valve stem. The plug end of the valve stem is inserted into the compression spring, such that a smaller diameter of the conical spring is in contact with the spring flange. The actuation end of the valve stem is inserted into plug bore, until the stem o-ring contacts a bottom of the plug bore. The retention plug is threaded into the valve body and tightened with the pair of opposing flats. The body o-ring is pushed over the threaded shank and into the body o-ring groove. The check ball is placed in the ball counter bore and the screen disc is placed in the screen counter bore. The threaded shank is threaded into the retention tail or the valve extender. If the valve extender is used, the extender threaded shank is threaded into the threaded shank tap of the retention tail.

Accordingly, it is an object of the present invention to provide an animal watering valve, which prevents contaminated water inside the watering device from being sucked back into a main water supply during a flushing cycle of an animal watering system.

DETAILED DESCRIPTION OF THE PREFERRED EMBODIMENTS

Figure 1:
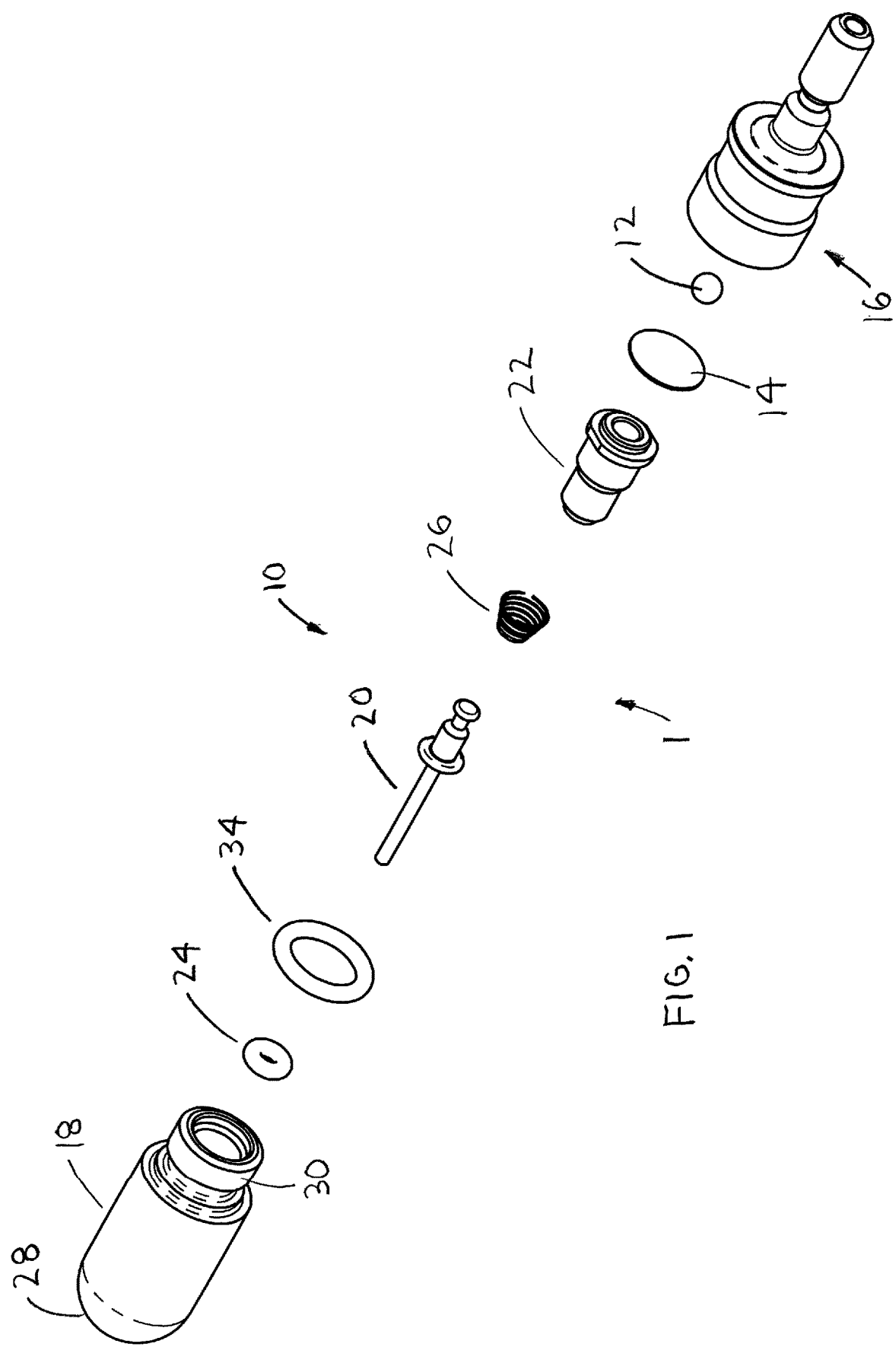
FIG. 1 is an exploded perspective view of an animal watering valve in accordance with the present invention.
Figure 2:
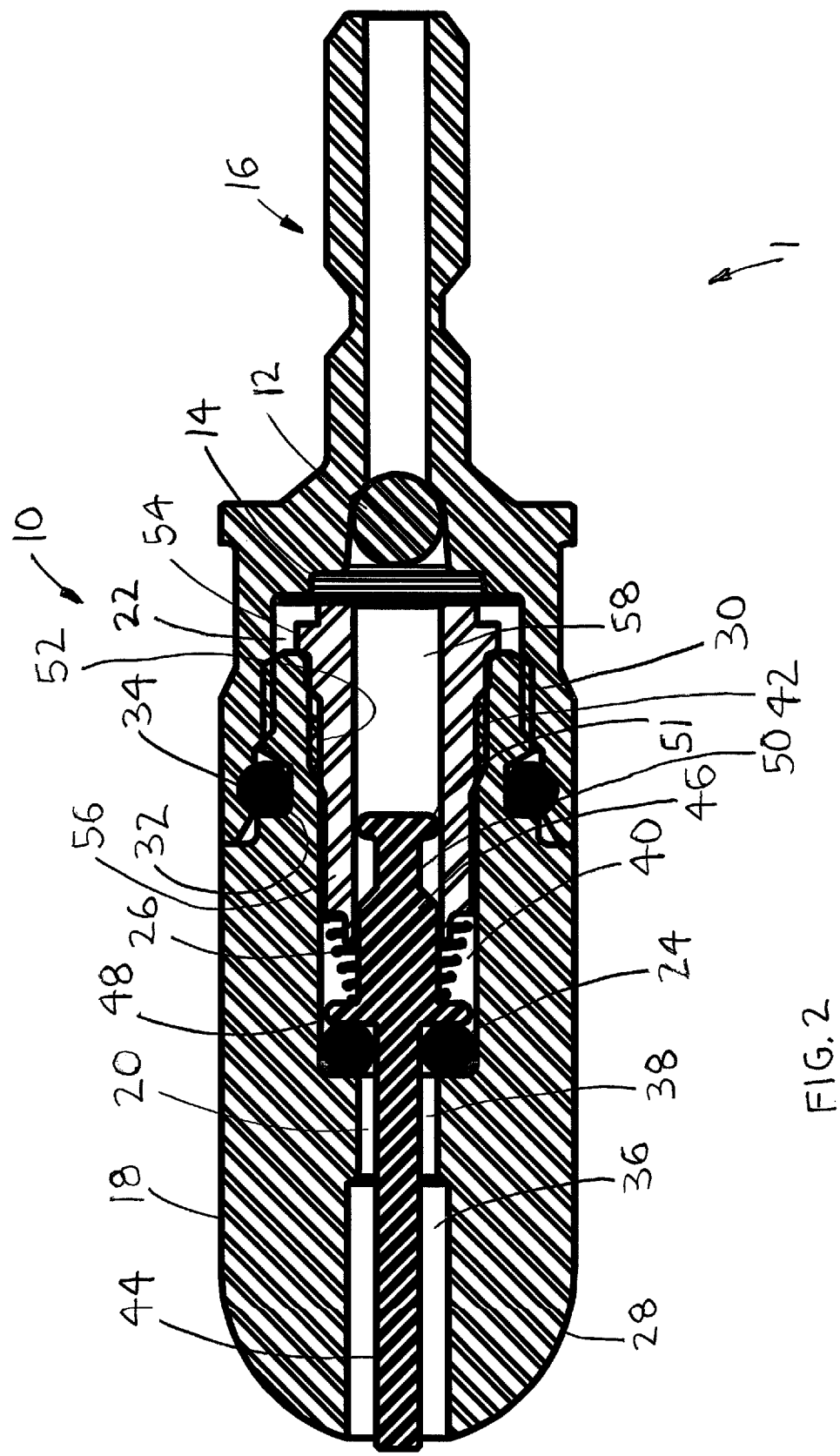
FIG. 2 is a cross sectional view of an animal watering valve in accordance with the present invention.

With reference now to the drawings, and particularly to FIG. 1, there is shown an exploded perspective view of an animal watering valve 1. With reference to FIG. 2, the animal watering valve 1 preferably includes a valve device 10, a check ball 12, a screen disc 14 and retention tail 16. The valve device 10 preferably includes a valve body 18, a valve stem 20, a retention plug 22, a stem o-ring 24 and a compression spring (biasing device) 26. The valve body 18 preferably includes a bullet nose 28 formed on one end and a threaded shank 30 formed on an opposing end thereof. The threaded shank 30 preferably has a diameter that is less than an outer diameter of the valve body 18. A body o-ring groove 32 is formed between an end of the valve body 18 and an end of the threaded shank 30 to receive a body o-ring 34. A valve counter bore 36 is formed in the one end of the valve body 18 to receive the valve stem 20. A through hole 38 is formed through a length of the valve body 18. A plug bore 40 is formed in the opposing end of the valve body 18 to substantially a middle of a length thereof. A portion of an entrance of the plug bore 40 is threaded to form a plug thread 42. The valve stem 20 preferably includes an actuation end 44, a plug end 46 and a spring flange 48. The actuation end 44 extends from one end of the spring flange 48 and the plug end 46 extends from an opposing end of the spring flange 48. A reduced diameter 50 is formed on a plug end 46 of the valve stem 20 to create a pivot disc 51. The pivot disc 51 improves consistency of a pivot/fulcrum point and improves consistency of actuation force and flow.

The retention plug 22 preferably includes a threaded portion 52, a rotation flange 54 and a stem portion 56. The stem portion 56 extends from one end of the threaded portion 52 and the rotation flange 54 is formed on an opposing end of the threaded portion 52. A pair opposing flats are preferably formed on an outer perimeter of the rotation flange 54. The plug thread 42 of the valve body 18 is sized to threadably receive the threaded portion 52 of the retention plug 52. A stem bore 58 is formed through the retention plug 22. The stem bore 58 is sized to loosely receive the plug end 46 of the valve stem 20. The compression spring 26 is preferably conical shaped. However, a cylindrically shaped compression spring may also be used.

Figure 3:
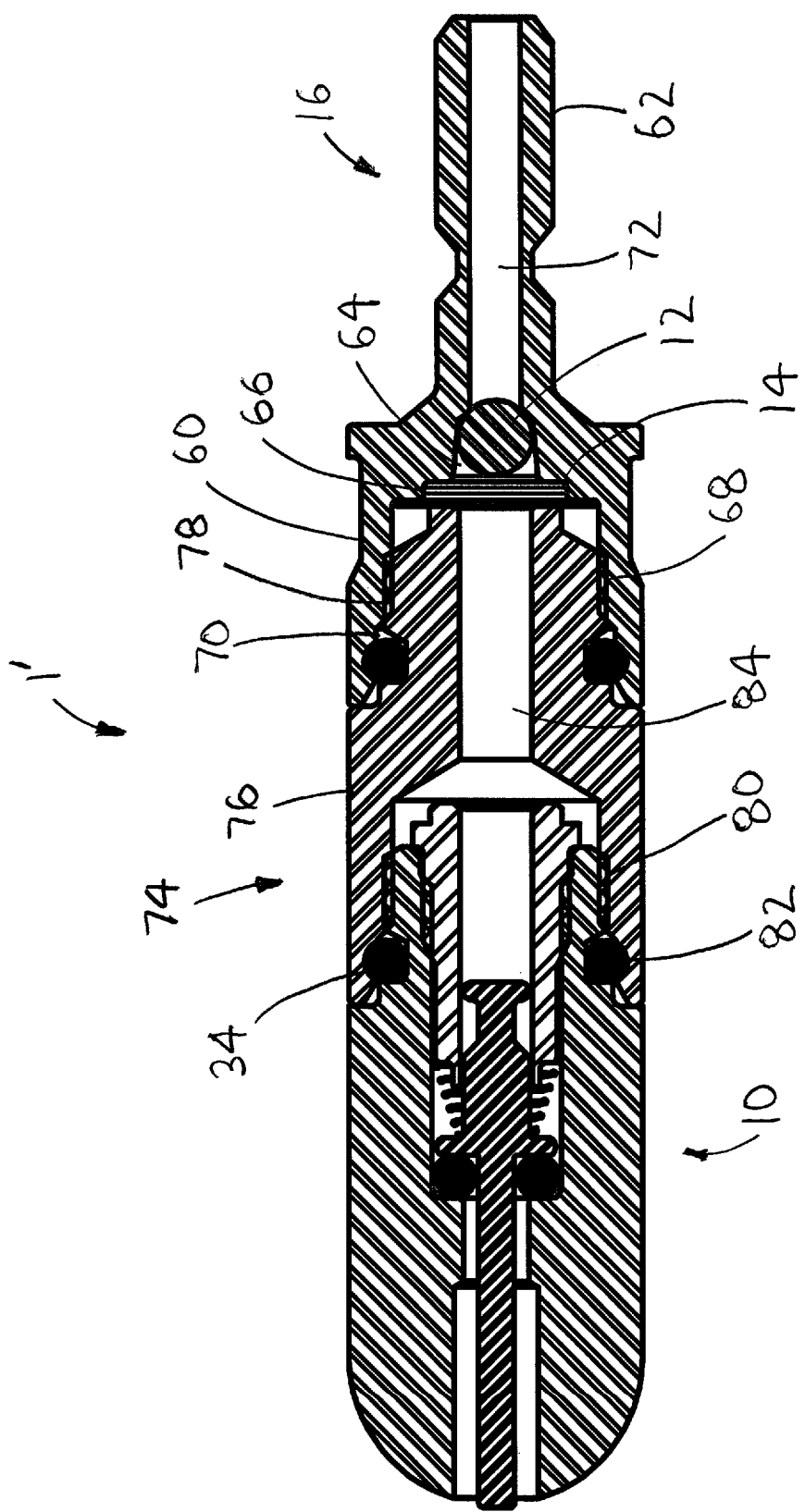
FIG. 3 is a cross sectional view of an animal watering valve with a valve extender in accordance with the present invention.

With reference to FIG. 3, the retention tail 16 preferably includes a receiver body 60 and an attachment shaft 62. The attachment shaft 62 extends from an end of the receiver body 60. The attachment shaft 62 may include a quick release profile, threads or any other suitable design. The receiver body 60 includes a ball tapered counter bore 64, a screen counter bore 66, a threaded shank tap 68 and an o-ring counter bore 70 formed in one end thereof. A water bore (water opening) 72 is formed through the attached tail 62. The ball tapered counter bore 64 is sized to receive the check ball 12. The screen counter bore 66 is sized to receive the screen disc 14. The threaded shank tap 68 is sized to threadably receive the threaded shank 30 of the valve body 18. The o-ring counter bore 70 is sized to receive the body o-ring 34.

A valve extender 74 may be used to extend a length of the animal watering device 1'. The valve extender 74 preferably includes an extender receiver body 76 and an extender threaded shank 78. The extender threaded shank 78 extends from an end of the extender receiver body 76. The extender receiver body 76 includes a threaded shank tap 80 and an o-ring counter bore 82 formed in one end thereof. A water bore 84 is formed through the valve extender 74. The extender threaded shank tap 80 is sized to threadably receive the threaded shank 30 of the valve body 18. The o-ring counter bore 82 is sized to receive the body o-ring 34.

The animal watering valve 1, 1' is preferably assembled in the following manner. The stem o-ring 24 is pushed on to the actuation end 44 of the valve stem 20. The plug end 46 of the valve stem 20 is inserted into the compression spring 26, such that a smaller diameter of the conical spring 26 is in contact with the spring flange 48. The actuation end 44 of the valve stem 20 is inserted into the plug bore 40, until the stem o-ring 24 contacts a bottom of the plug bore 40. The retention plug 22 is threaded into the valve body 18 and tightened with the pair of opposing flats. The body o-ring 34 is pushed over the threaded shank 30 and into the body o-ring groove 32. The check ball 12 is placed in the ball tapered counter bore 64 and the screen disc 14 is placed in the screen counter bore 66. The threaded shank 30 is threaded into the retention tail 16 or the valve extender 74. If the valve extender 74 is used, the extender threaded shank 78 is threaded into the threaded shank tap 68 of the retention tail 16.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An animal watering valve for use in an animal water system, comprising:
    a valve body includes a valve bore formed in one end, a plug bore formed in an opposing end of said valve body;
    a biasing device;
    a valve stem includes a flange, said flange is biased against a bottom of said plug bore with said biasing device;
    a check ball;
    a screen disc; and
    a retention tail includes a receiver body and an attachment shaft, said attachment shaft extends from an end of said receiver body, a water opening is formed through said retention tail, said receiver body includes a ball counter bore, a screen counter bore and a threaded shank tap, said check ball is retained in said ball counter bore, said screen disc is retained in said screen counter bore, said opposing end of said valve body is threaded into said threaded shank tap.

2. The animal watering valve for use in an animal water system of claim 1 wherein:
    a through hole is formed through said valve body.

3. The animal watering valve for use in an animal water system of claim 1 wherein:
    said valve body includes a bullet nose formed on said one end, a threaded shank formed on said opposing end of said valve body.

4. The animal watering valve for use in an animal water system of claim 1 wherein:
    a valve extender includes an extender receiver body and an extender threaded shank, said extender threaded shank extends from an end of said extender receiver body, said opposing end of said valve body is threaded into said extender receiver body, said extender threaded shank is threaded into said threaded shank tap.

5. The animal watering valve for use in an animal water system of claim 1, further comprising:
    a stem o-ring is retained on said valve stem.

6. An animal watering valve for use in an animal water system, comprising:
    a valve body includes a valve bore formed in one end, a plug bore formed in an opposing end of said valve body;
    a valve stem includes a flange, an actuation end and a plug end, said actuation end extends from one end of said flange, plug end extends from an opposing end of said flange;

a retention plug includes a plug hole, said plug hole is sized to receive said plug end, wherein said retention plug is threaded into said plug bore;

a check ball;

a screen disc; and a retention tail includes a receiver body and an attachment shaft, said attachment shaft extends from an end of said receiver body, a water opening is formed through said retention tail, said receiver body includes a ball counter bore, a screen counter bore and a threaded shank tap, said check ball is retained in said ball counter bore, said screen disc is retained in said screen counter bore, said opposing end of said valve body is threaded into said threaded shank tap.

7. The animal watering valve for use in an animal water system of claim 6 wherein:

a biasing device for biasing said flange against a bottom of said plug bore.

8. The animal watering valve for use in an animal water system of claim 7 wherein:

a through hole is formed through said valve body.

9. The animal watering valve for use in an animal water system of claim 6 wherein:

a rotation flange is formed on an end of said retention plug.

10. The animal watering valve for use in an animal water system of claim 9 wherein:

a pair of opposing flats are formed on an outer perimeter of said rotation flange.

11. The animal watering valve for use in an animal water system of claim 6 wherein:

said valve body includes a bullet nose formed on said one end, a threaded shank is formed on said opposing end of said valve body.

12. The animal watering valve for use in an animal water system of claim 6 wherein:

a valve extender includes an extender receiver body and an extender threaded shank, said extender threaded shank extends from an end of said extender receiver body, said opposing end of said valve body is threaded into said extender receiver body, said extender threaded shank is threaded into said threaded shank tap.

13. The animal watering valve for use in an animal water system of claim 1, further comprising:

a stem o-ring is retained on said valve stem.

14. An animal watering valve for use in an animal water system, comprising:

a valve body includes a valve bore formed in one end, a plug bore is formed in an opposing end of said valve body;

a valve stem includes a flange, an actuation end and a plug end, said actuation end extends from one end of said flange, plug end extends from an opposing end of said flange;

a retention plug includes a plug hole, said plug hole is sized to receive said plug end, wherein said retention plug is threaded into said plug bore;

a biasing device is inserted between an end of said retention plug and said flange;

a check ball;

a screen disc; and a retention tail includes a receiver body and an attachment shaft, said attachment shaft extends from an end of said receiver body, a water opening is formed through said retention tail, said receiver body includes a ball counter bore, a screen counter bore and a threaded shank tap, said check ball is retained in said ball counter bore, said screen disc is retained in said screen counter bore, said opposing end of said valve body is threaded into said threaded shank tap.

15. The animal watering valve for use in an animal water system of claim 14 wherein:

a through hole is formed through said valve body.

16. The animal watering valve for use in an animal water system of claim 14 wherein:

a rotation flange is formed on an end of said retention plug.

17. The animal watering valve for use in an animal water system of claim 16 wherein:

a pair of opposing flats are formed on an outer perimeter of said rotation flange.

18. The animal watering valve for use in an animal water system of claim 14 wherein:

said valve body includes a bullet nose formed on said one end, a threaded shank is formed on said opposing end of said valve body.

19. The animal watering valve for use in an animal water system of claim 14 wherein:

a valve extender includes an extender receiver body and an extender threaded shank, said extender threaded shank extends from an end of said extender receiver body, said opposing end of said valve body is threaded into said extender receiver body, said extender threaded shank is threaded into said threaded shank tap.

20. The animal watering valve for use in an animal water system of claim 14, further comprising:

a stem o-ring is retained on said valve stem.

* * * * *